United States Patent [19]

Saint-Amour

[11] Patent Number: 4,510,805
[45] Date of Patent: Apr. 16, 1985

[54] FLUID GAUGING

[76] Inventor: John D. Saint-Amour, 158 E. Main St., Westborough, Mass. 01581

[21] Appl. No.: 534,495

[22] Filed: Sep. 21, 1983

[51] Int. Cl.³ .............................................. G01B 13/10
[52] U.S. Cl. ..................................................... 73/37.9
[58] Field of Search .............................. 73/37.9, 37.5

[56] References Cited

U.S. PATENT DOCUMENTS

| 2,358,769 | 9/1944 | Aller | 73/37.9 |
| 3,065,628 | 11/1962 | Gesell | 73/37.9 |
| 3,438,244 | 4/1969 | Plumpe, Jr. | 73/37.9 |
| 3,577,766 | 5/1971 | Walker | 73/37.9 |

FOREIGN PATENT DOCUMENTS

| 305352 | 7/1971 | U.S.S.R. | 73/37.9 |
| 486217 | 12/1975 | U.S.S.R. | 73/37.9 |

Primary Examiner—S. Clement Swisher
Assistant Examiner—Joseph W. Roskos
Attorney, Agent, or Firm—Charles Hieken

[57] ABSTRACT

A pin is formed with an axial bore at the bottom end for receiving compressed air and containing a diffuser. This bored end has a portion of progressively increasing cross section toward the end. A pair of axially spaced diametrical openings in space quadrature intersect the axial bore. A bumper with a resilient face may be urged toward the pin when an air switch is open. A source of compressed air is coupled to the pneumatic cylinder through an air switch and to sample and reference conduits through a pressure regulator. There are needle valves between the pressure regulator and the sample and reference conduits, respectively. A meter measures the differential air pressure between the sample and reference conduits.

6 Claims, 4 Drawing Figures

FLUID GAUGING

The present invention relates in general to fluid gauging and more particularly concerns novel apparatus and techniques for accurately measuring the inside diameter of small flexible tubing with a novel air gauge that is relatively easy and inexpensive to manufacture and operate by relatively unskilled personnel while providing accurate measurements of the inside diameter of small flexible tubing.

Accurate measurement of the inside diameter of soft flexible tubing, such as used for transporting various pharmaceutical and other fluids in medical applications, is difficult for a number of reasons. Using conventional air gauges, it is difficult to develop enough sensitivity by measuring air flow through some commonly used sizes, such as 0.1-inch inside diameter tubing. Another problem resides in developing a predictable repeatable air path upon the insertion of a flow-reducing pin into the tubing. Still another difficulty resides in sealing the tube at the air-insertion end so that all the air traverses the length of the tube/pin combination.

A typical prior art approach for measuring the inside diameter of rigid tubing comprises inserting a pin of outside diameter about 10% smaller than the inside diameter of the tubing to be measured. This approach reduces the cross sectional area of the air path and allows the measuring system to more easily detect small deviations in the inside diameter of the tubing from a desired standard value. However, applying this same technique to flexible tubing yields unreliable and unpredictable results.

A search of subclasses 37.5 and 37.9 of class 73 uncovered U.S. Pat. Nos. 2,692,498, 2,718,140, 2,889,704, 3,178,931, 3,438,244, British Pat. No. 1,166,178, German Pat. No. 879,466 and Russian Pat. Nos. 192,442 and 695,898.

It is an important object of the invention to provide improved fluid gauging.

According to the invention, there is pin means for receiving a hollow item, such as flexible tubing, whose inside cross sectional area is to be measured. There is reference valve means for restricting the flow of fluid therethrough to a predetermined value characterized by a hydraulic impedance representative of a desired standard cross sectional area for the hollow item to be inserted on the pin means. There is a source of fluid under pressure, means for coupling the fluid source to both the pin means to develop fluid flow along the pin means axis between the pin means and the hollow item characterized by hydraulic impedance and to the reference valve means over parallel paths, and means for sensing the difference in a parameter of the paths, such as in fluid pressure over the parallel paths to provide an indication of the deviation of the cross sectional area of the hollow item then seated on the pin means from the reference value represented by the reference valve means. Preferably, there is means for pressing one side of the hollow item against the pin means, and the pin means preferably has a closed end portion of progressively increasing cross section toward the closed end for effecting a seal at one end of the hollow item. Preferably the pressing means is formed with a resilient face and may be actuated by a pneumatic cylinder. Preferably the fluid is air, and the pin means includes a central channel for receiving the air including diffusing means for diffusing the air and is formed with aperture means extending radially outward for expelling the air into the region between the pin means and the hollow item.

According to the method of the invention, a hollow item open at both ends of known reference cross sectional area is placed over the pin means to seal off one end, pressure is applied on one side of the hollow item to hold that side firmly in engagement with the pin means, fluid under pressure is delivered to both the pin means and the reference valve means, and the reference valve means is adjusted until indicating means indicates reference value for the cross sectional area, typically the center of a meter having a scale that may be calibrated in units above and below reference value. The steps described are repeated with items of unknown cross sectional area, except the reference valve is not changed, and the indicating means is observed to sense the deviation of the unknown cross sectional area of the unknown item relative to the reference value.

Numerous other features, objects and advantages of the invention will become apparent from the following specification when read in connection with the accompanying drawing in which.

Figure 1:
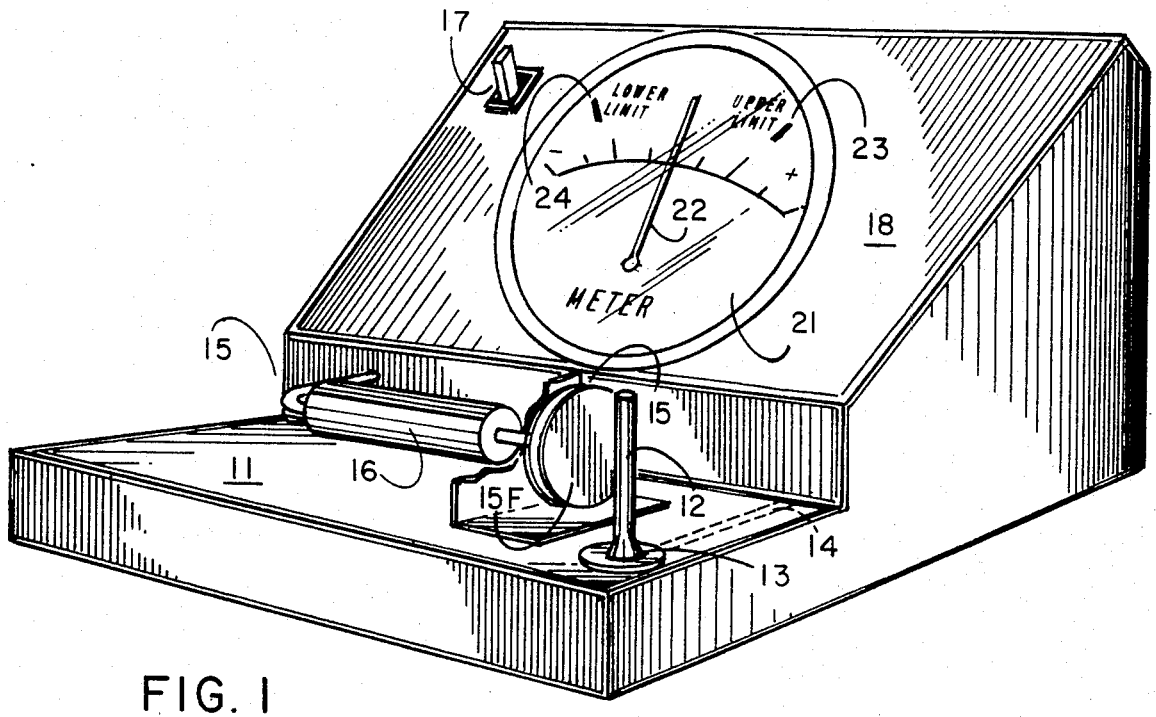
FIG. 1 is a pictorial perspective view of elements in an embodiment of the invention.

With reference now to the drawing, and more particularly FIG. 1 thereof, there is shown a pictorial perspective representation of portions of an exemplary embodiment of the invention. The invention comprises a base 11 supporting pin 12 of progressively increasing cross section at the bottom or closed end 13 that receives air under pressure through conduit 14 in base 11 from a source in housing 15. Base 11 also supports an assembly including a bumper 15 having a resilient face 15F actuated by a pneumatic cylinder 16 when air switch 17 on sloping face 18 of housing 15 is opened. Sloping face 18 also carries a meter 21 that indicates the deviation of the inside diameter of a section of flexible tubing from a prescribed reference value and indicates an acceptable inside diameter if pointer 22 is between upper limit 23 and lower limit 24 during test. Other components of the system may be housed in housing 15.

Figure 2:
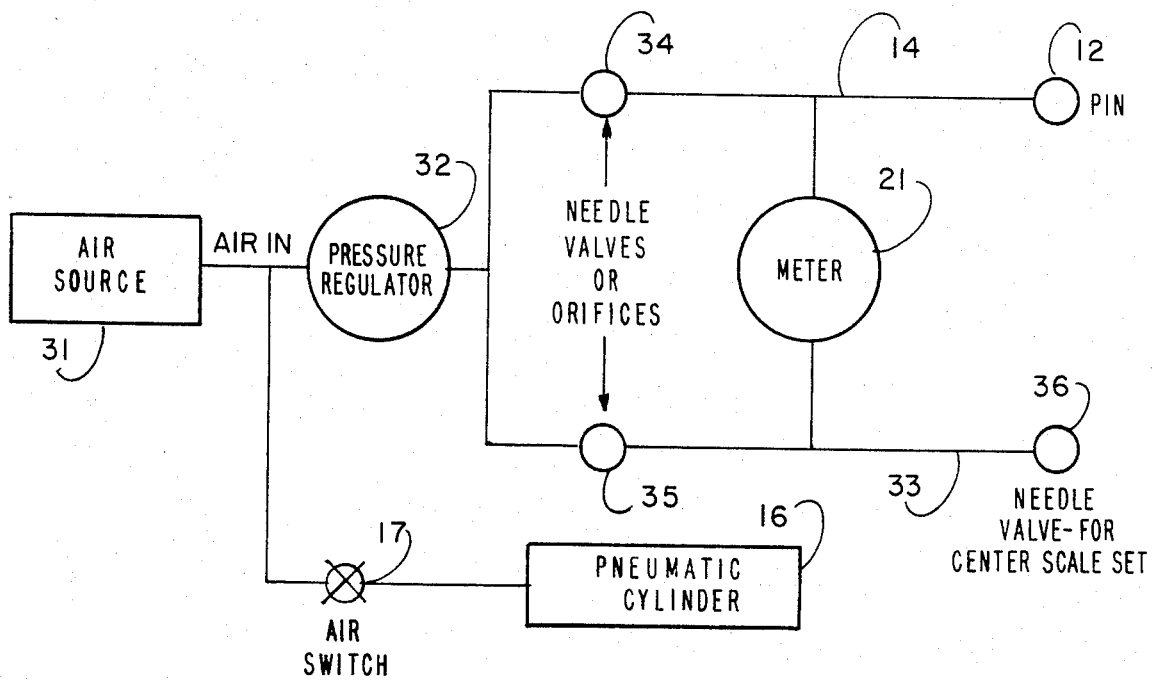
FIG. 2 is a schematic representation of an embodiment of the invention.

Referring to FIG. 2 there is shown a schematic representation of a system according to the invention. An air source 31 provides air under pressure. One branch couples air from source 31 through air switch 17 to pneumatic cylinder 16. A second branch couples air through pressure regulator 32 to a test branch 14 and a reference branch 33, in parallel with test branch 14. Needle valves or orifices 34 and 35 may be inserted in test branch 14 and reference branch 33, respectively, for regulating the air flow through these branches. Differential air pressure meter 21, typically capable of sensing a pressure differential between 0 and 5 inches of water, is connected across parallel branches 14 and 33. Branch 33 is connected to reference needle valve 36 for setting pointer 22 to 0 when a flexible tube of reference inside diameter is inserted on pin 12. Test branch 14 delivers air under pressure to pin 12.

Figure 3:
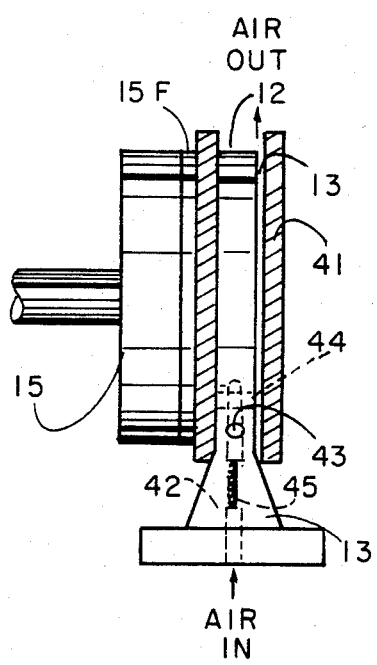
FIGS. 3 and 4 are elevation and plan views, respectively, of a hollow tube in section seated on the pin.
Figure 4:
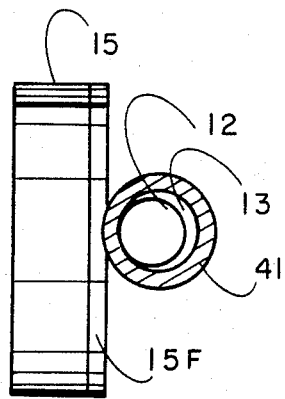

Referring to FIGS. 3 and 4, there are shown elevation and plan views, respectively, of flexible tube 41 in section seated on pin 12. As best seen in FIG. 3 pin 12 is formed with an axial opening 42 at one end intersecting with two axially displaced diametrical passages 43 and 44 in space quadrature for injecting air into the region between pin 12 and flexible tube 41. Opening 42 also includes diffuser material 45, typically steel wool, for diffusing the air. During measurement resilient face 15F of bumper 15 presses firmly against one side of flexible tube 41 to keep that side in firm contact with pin 12 as shown and thereby create a repeatable generally crescent-shaped cross sectional area representative of the inside diameter of the flexible tubing.

Having described the physical arrangement of the system, its mode of operation will be discussed. First, the system is calibrated by placing a tube of known standard diameter on pin 12 with the bottom firmly sealed about lower section 13 so that air can escape only through the top. This reference to may be flexible or rigid with a flexible bottom sealing collar. Rigid tubing, such as made of brass, is easier to make to an exact reference size. Then switch 17 is opened to allow compressed air from air source 31 to enter pneumatic cylinder 16 and push the flexible face 15F of bumper 15 against one side of pin 12 as shown in FIGS. 3 and 4, preferably from a point below lower diametrical opening 43 to a point near the top of pin 12 so that the generally cresent-shaped opening 13 is essentially uniform for most of the length of the section of tube 41 surrounding pin 12. Needle valve 36 is then adjusted until pointer 22 of meter 21 is centered on "0" or generally at a location near mid scale. Then air switch 17 is closed, retracting bumper 15 and allowing the section of flexible tube of known reference inside diameter to be removed. Then a section of tube 41 of known diameter greater than reference diameter by an increment corresponding to the upper acceptable limit is inserted on pin 12 in the manner just described. If the needle falls short of indicating the upper limit mark on the scale, the air pressure from regulator 32 must be increased to increase the span. Then, the center scale reference sample is replaced on pin 12, and needle valve 36 is readjusted to "0" the instrument. This procedure might be necessary to follow a number of times, to correlate "0" and span. The low reference standard should now be checked; only very minor corrections in needle valve 36 or pressure regulator 32 might be necessary. Alternatively, one need only make the first-mentioned adjustment of reference needle valve 36, and then use a grease pencil or other suitable means for marking the upper and lower limits. Thereafter, sections of flexible tubing of unknown inside diameter may readily be checked by placing them over pin 12 with the bottom end sealed, opening air switch 17, and observing the reading on meter 21.

The invention has a number of advantages. With resilient face 15F of bumper 15 urging one side of the flexible tube 41 against pin 12, the air passage to the opened end is of substantially uniform cross section free of the convoluted path developed by a deformed sample of tubing resting against a straight round pin that produces random turbulence, thereby standardizing the skin friction effect on the air flow in the tubing and against the air stream at the point of entry into the tubing through outlets 43 and 44. Furthermore, the snug substantially fluid-tight seal at the bottom prevents undesired air leakage that might affect the reading.

An actual embodiment of the invention has been constructed for measuring the inside diameter of soft vinyl medical tubing nominally 0.1 inch in inside diameter while obtaining measurement repeatability better than ±0.00025".

There has been described novel apparatus and techniques for accurately measuring the inside diameter of hollow items, such as flexible medical tubing. It is evident that those skilled in the art may now make numerous uses and modifications of and departures from the specific apparatus and techniques described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Fluid gauging apparatus comprising,
   pin means for receiving a hollow item whose cross sectional area is to be measured,
   reference valve means for developing a hydraulic impedance representative of a predetermined reference cross sectional area for a hollow item to be tested,
   a source of fluid pressure,
   means including test conduit means for coupling said fluid under pressure from said source to said pin means to develop fluid flow along the axis of said pin means between said pin means and a hollow item when seated thereon characterized by a hydraulic impedance representative of the inside cross sectional area of the hollow item then seated on said pin means,
   indicating means responsive to a predetermined parameter differential between said test conduit and said reference conduit for providing an indication of the deviation of the cross sectional area of the hollow item then seated on said pin means relative to said reference value,
   and pressing means for urging one side of the hollow item against said pin means to establish a fluid passage between said pin means and the hollow item seated on said pin means for at least nearly the entire length of said passage so that said parameter differential is accurately representative of the difference between the inside cross sectional area of said hollow item and said reference cross sectional area.

2. Fluid gauging apparatus in accordance with claim 1 and further comprising,
   means for effecting a seal between a closed end of the hollow item being tested and said pin means while the other end thereof is open so that fluid flows essentially axially in the region between said pin means and the inside wall of said hollow item from the closed end to the open end.

3. Fluid gauging apparatus in accordance with claim 1 and further comprising,
   means for effecting a seal between a closed end of the hollow item being tested and said pin means while the other end thereof is open so that air flows essentially axially in the region between said pin means and the inside wall of said hollow item from the closed end to the open end.

4. Fluid gauging apparatus in accordance with claim 1 wherein said pin means is formed with an axial bore at one end for receiving said fluid and with at least one radial opening intersecting said bore for allowing escape of fluid under pressure from said pin means into the region between said pin means and the inside wall of the hollow item being tested.

5. Fluid gauging apparatus in accordance with claim 1 wherein said pressing means comprises,
bumper means having a resilient face thereon,
and means for actuating said bumper means to urge said resilient face against one side of the hollow item being tested so that the inside thereof contacts said pin means.

6. A method of using the apparatus of claim 1 which method includes the steps of,
placing a hollow item over said pin means,
admitting said fluid under pressure into the region between said pin means and the inside wall of said hollow item characterized by a hydraulic impedance representative of the inside cross sectional area of said hollow item,
simultaneously applying said fluid under pressure to said reference valve means through said reference conduit,
sensing the difference between a parameter of said reference conduit and said sample conduit to provide an indication of the difference between the inside cross sectional area of the item being tested and the reference cross sectional area represented by said reference valve,
and pressing on one side of said hollow item to cause an opposite portion in the inside wall of said hollow item to contact said pin means along the length of the fluid passage between the pin means and the hollow item for at least most of the length thereof.

* * * * *